US012683366B1

(12) United States Patent
Jordan et al.

(10) Patent No.: US 12,683,366 B1
(45) Date of Patent: Jul. 14, 2026

(54) AIR-POWERED SYSTEM FOR ROUTING A PULLING CORD THROUGH A CONDUIT

(71) Applicants: David S. Jordan, Knoxville, TN (US); Michael C. Jordan, Knoxville, TN (US); Scott M. Jordan, Knoxville, TN (US)

(72) Inventors: David S. Jordan, Knoxville, TN (US); Michael C. Jordan, Knoxville, TN (US); Scott M. Jordan, Knoxville, TN (US)

(73) Assignee: iTool Equipment Holding LLC, Clinton, TN (US)

( * ) Notice: Subject to any disclaimer, the term of this patent is extended or adjusted under 35 U.S.C. 154(b) by 486 days.

(21) Appl. No.: 18/445,162

(22) Filed: May 4, 2023

Related U.S. Application Data

(60) Provisional application No. 63/473,189, filed on May 6, 2022.

(51) Int. Cl.
H02G 1/08 (2006.01)
(52) U.S. Cl.
CPC .............. H02G 1/086 (2013.01); H02G 1/083 (2013.01)
(58) Field of Classification Search
CPC ......... H02G 1/081; H02G 1/083; H02G 1/086
See application file for complete search history.

(56) References Cited

U.S. PATENT DOCUMENTS 3,301,531 A * 1/1967 Corsiglia ............... H02G 1/086
254/134.4
2008/0272350 A1* 11/2008 Lu .......................... H02G 1/086
254/134.3 FT

OTHER PUBLICATIONS

Lersa Pierluigi—EP-2725669-A1 (Year: 2014).*

* cited by examiner

*Primary Examiner* — Tyrone V Hall, Jr.
(74) *Attorney, Agent, or Firm* — Michael E. McKee

(57) ABSTRACT

A system for routing a pulling cord endwise through a cylindrical conduit for purposes of securing the pulling cord to an item desired to be pulled through the conduit with the pulling cord utilizes an elongated carriage including a disc-shaped head and a stem portion to which the pulling cord is securable and which is joined to the disc-shaped head for trailing the head of the elongated carriage through the conduit as the carriage is advanced head-first along the conduit. The stem portion is arranged substantially normal to the rearwardly-directed face of the head, and the disc-shaped head of the carriage is sized to substantially span the inner diameter of the conduit. For purposes of delivering air under pressure into the conduit for the purpose of advancing the carriage therealong, a leaf blower can be utilized.

17 Claims, 3 Drawing Sheets

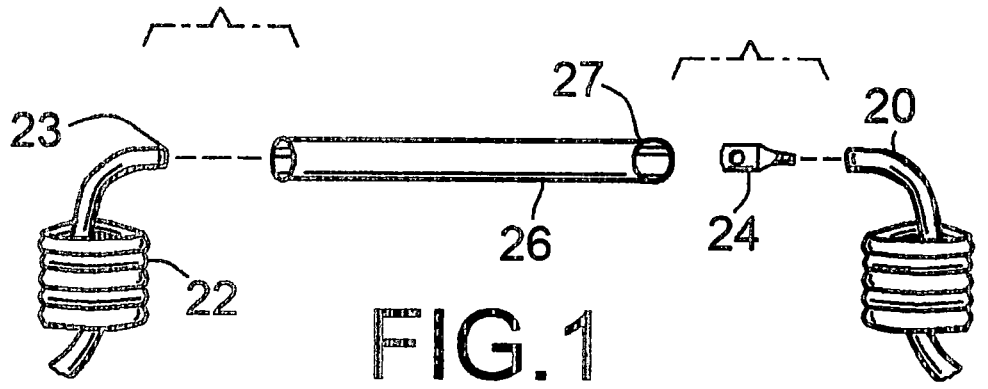
FIG.1
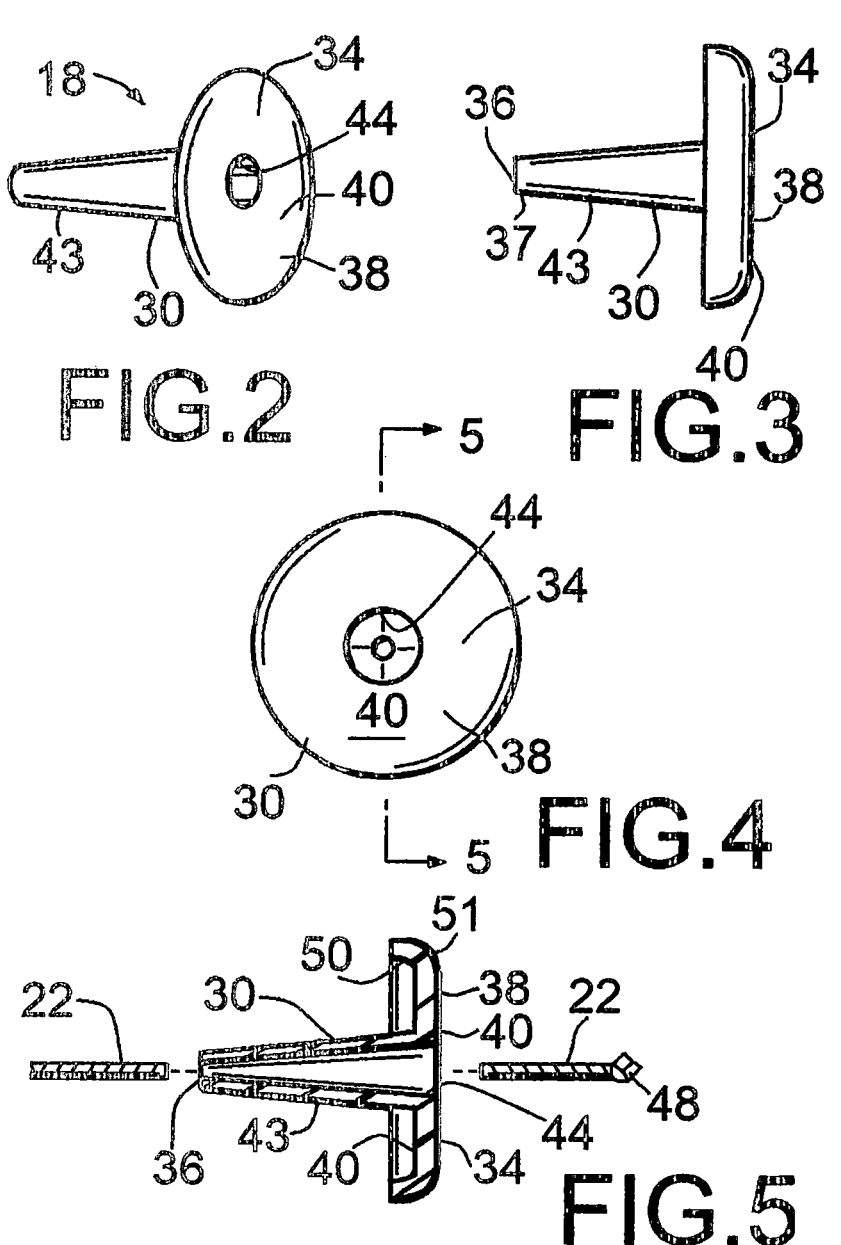
FIG.2        FIG.3
FIG.4
FIG.5

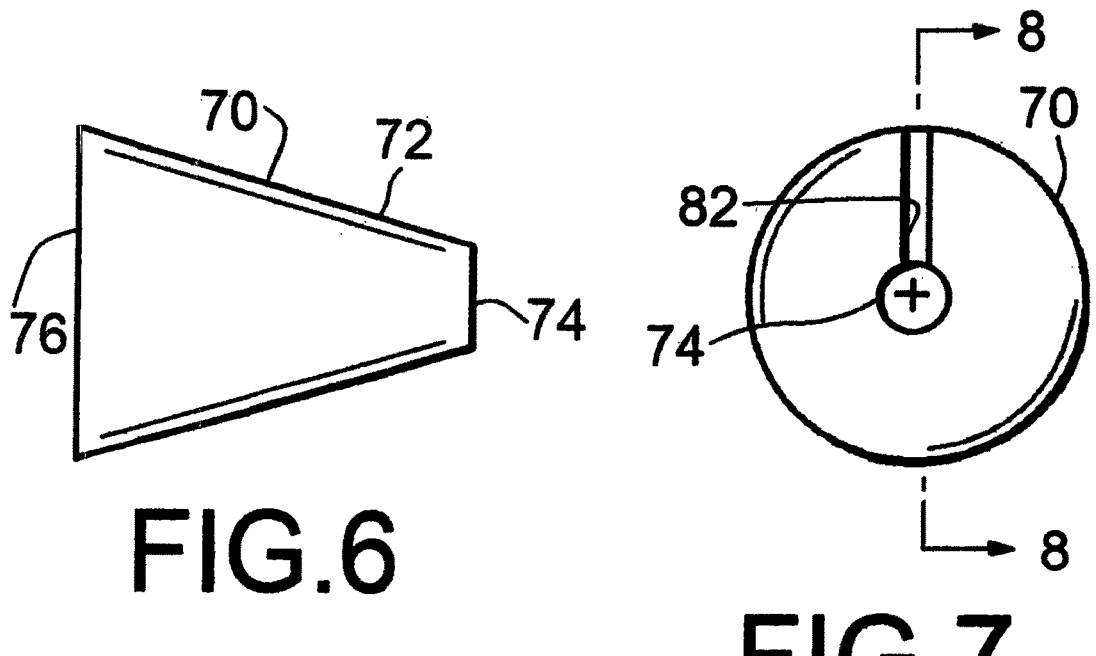
FIG.6
FIG.7
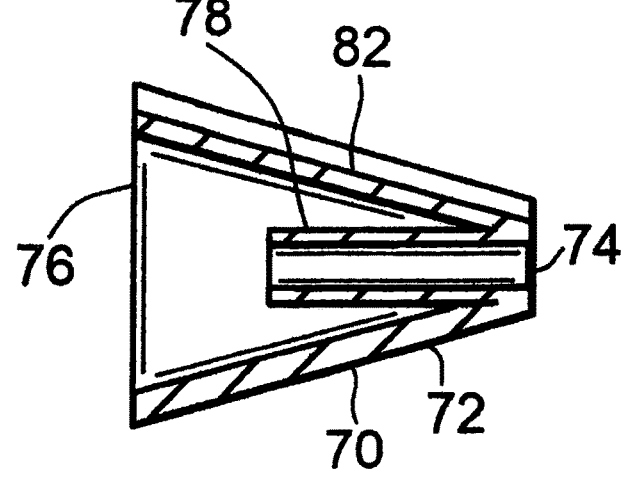
FIG.8
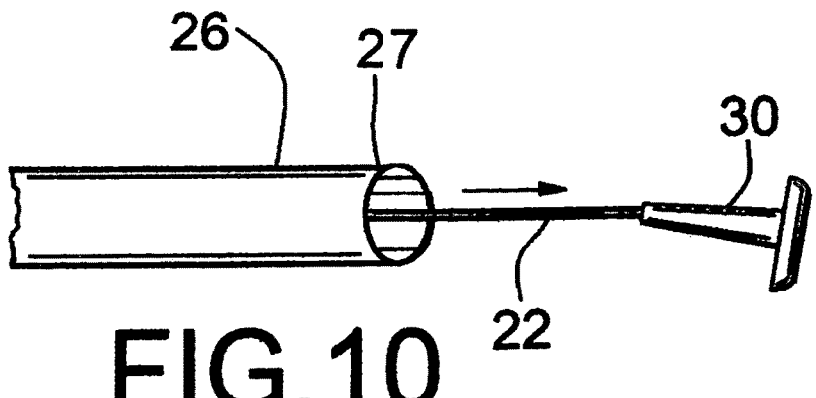
FIG.10

AIR-POWERED SYSTEM FOR ROUTING A PULLING CORD THROUGH A CONDUIT

The benefit of Provisional Application Ser. No. 63/473,189, filed May 6, 2022 and entitled AIR POWERED SYSTEM FOR ROUTING A PULLING CORD THROUGH A CONDUIT, is hereby claimed. The disclosure of this referenced provisional application is incorporated herein by reference.

BACKGROUND OF THE INVENTION

This invention relates generally to means snd methods for routing, or threading, a cord used for pulling an item through a conduit and relates, more particularly, to a system for routing a pulling cord endwise through a conduit for subsequent item-pulling purposes.

It is commonly desirable at a jobsite to pull an item, such as a wire, cable or conduit of small diameter, through a conduit (e.g. of larger diameter). However and before an end of a pulling cord can be secured about the item desired to be pulled through a conduit, the pulling cord must first be routed endwise through the conduit. One scheme for routing a pulling cord through a conduit involves the securing of an end of the pulling cord to a sponge-like body and then using air, under pressure, to forcibly blow, and thereby move, the sponge-like body through the conduit until the body, with the pulling cord attached, exits the opposite, or distal end, of the conduit. However, such a scheme is commonly unreliable in operation in that the sponge-like body will occasionally get stuck as it is moved along the conduit, and if there exists moisture within the conduit, the sponge-like body is apt to absorb the moisture so that the body is rendered more difficult to be pushed along the length of the conduit with pressurized air.

It would be desirable to provide a new and improved air-powered system for routing a pulling cord endwise along the length of a conduit.

Accordingly, it is an object of the present invention to provide a new and improved air-powered system for transporting a pulling cord endwise along the lenght of a conduit.

Another object of the present invention is to provide such a system which employs a specially-shaped carriage to which an end of the pulling cord is readily securable for transport with the carriage through a conduit.

Still another object of the present invention to provide such a system wherein air power which is used for transporting the carriage through a conduit can be supplied by a conventional leaf blower.

Yet another object of the present invention is to provide such a system which is uncomplicated in structure, yet effective in operation.

SUMMARY OF THE INVENTION

This invention resides in a system for routing a pulling cord endwise through a cylindrical conduit for purposes of securing the pulling cord to an item for pulling the item through the conduit with the pulling cord.

The system includes an elongated carriage having a body including a disc-shaped head and an elongated stem portion to which the pulling cord is securable and having two opposite ends and which is joined to the disc-shaped head for trailing the head of the elongated carriage through the conduit as the carriage is advanced along the conduit. The disc-shaped head end has a forwardly-directed face and an opposite rearwardly-directed face, and the stem portion is joined at one of its opposite ends to the rearwardly-directed face at about the center thereof and so that the stem portion is arranged substantially normal to the rearwardly-directed face. The disc-shaped head of the carriage is sized to substantially span the inner diameter of the conduit, and the system can include means for delivering air under pressure to the conduit so that by securing the pulling cord to the stem portion of the elongated carriage, inserting the carriage head-first into the conduit and then conducting air pressure against the rearwardly-directed face of the head, the carriage is advanced along the length of the conduit by way of the conducted air.

BRIEF DESCRIPTION OF THE DRAWINGS

FIG. 1 is a perspective view of a polyethylene conduit of relatively small diameter, a pulling cord and a polyethylene conduit of larger diameter through which the smaller conduit is desired to be pulled by way of the pulling cord.

FIG. 2 is a perspective view of a carriage of the system of the present invention.

FIG. 3 is a side elevation view of the FIG. 2 carriage as seen generally from the left in FIG. 2.

FIG. 4 is an end elevation view of the FIG. 2 carriage as seen from the right in FIG. 3.

FIG. 5 is a cross-sectional view taken about the line 5-5 of FIG. 4 and illustrating the manner in which the FIG. 1 pulling cording is secured to the FIG. 2 carriage.

FIG. 6 is a side elevation view of an air nozzle utilized in the system of the present invention.

FIG. 7 is an end elevation view of the FIG. 6 air nozzle as seen from the right in FIG. 6.

FIG. 8 is a cross-sectional view of the FIG. 6 air nozzle taken along line 8-8 of FIG. 7.

FIG. 10 is a perspective view of the carriage of the FIG. 9 view shown upon completion of its travel through the conduit of FIG. 9.

DETAILED DESCRIPTION OF AN ILLUSTRATIVE EMBODIMENT

Figure 9:
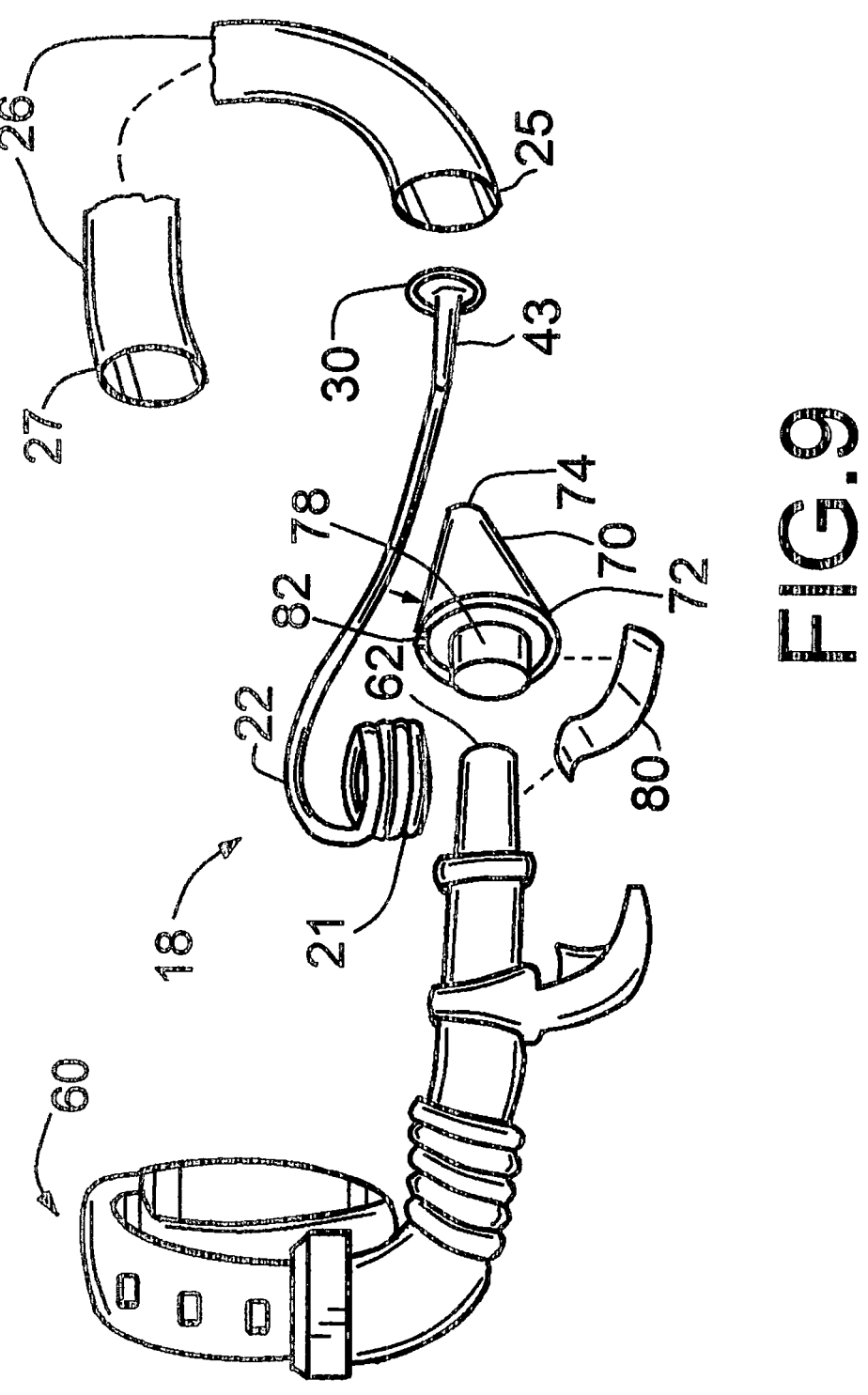
FIG. 9 is a perspective view illustrating schematically the componentry of the system of the present invention for routing an end of a pulling cord through the FIG. 1 conduit of larger diameter.

Turning now to the drawings in greater detail and considering first FIG. 1, there is depicted an exemplary environment, or application, in which the system, generally indicated 18 in FIGS. 2 and 9, of the present invention is desired to be employed. More specifically, the FIG. 1 environment includes a polyethylene conduit 20 of relatively small diameter, a pulling cord 22 and a polyethylene conduit 26 of larger diameter through which the conduit 20 of smaller diameter is desired to be pulled. Where the system 18 of the present invention finds its utility is that it is used to route, or thread, one end 23 of the pulling cord 22 through the conduit 26 of larger diameter so that the one end 23 of the pulling cord 22 can be secured, as with a conventional pulling eye 24 (FIG. 1) joined between the conduit 20 of smaller diameter and the pulling cord 22 for subsequent pulling of the smaller diameter conduit 20 through the larger diameter conduit 26 by pulling upon the end of the pulling cord 22 opposite the one end 23. An installation in which a small diameter conduit 20 (e.g. a micro-conduit) is desired to be pulled through a conduit 26 of larger diameter is common in applications involving the laying, or installation, of fiber optic cable throughout a building (not shown).

As will be apparent herein and with reference to FIG. 2, the system 18 of the present invention includes a carriage 30 (FIGS. 2-5) to which one end, indicated 23 in FIG. 1, of the pulling cord 22 is securable for advancement of the pulling cord 22 endwise (i.e. end 23-end first) along the conduit 26 and a conventional leaf blower 60 (FIG. 9) for delivering air under pressure, e.g. blown air, into the larger diameter conduit 26 so that the carriage 30, with the one end 23 of the pulling cord 22 secured thereto, is forced through the larger diameter conduit 26 ahead of the blown air. After the carriage 30 exits the opposite, or distal, end, indicated 27 in FIG. 1, of the larger diameter conduit 26, the pulling cord 22 is released from the carriage 30 and re-secured to a pulling eye 24 (FIG. 1) used for pulling the smaller diameter conduit 20 through the larger diameter conduit 26 by way of the pulling cord 22 (i.e. by pulling upon the end of the pulling cord 22 opposite the end 23 thereof.

With reference to FIGS. 2-5, the carriage 30 includes an elongated body 32 having two opposite ends 34, 36. At one end 34 of the body 32 is a disc-shaped head 38 defining a forwardly-directed face 40 which is intended to lead the head 38 through the FIG. 1 conduit 26 as the carriage 30 is advanced therealong and also defines a rearwardly-directed face 42 opposite the forwardly-directed face 40. The carriage body 32 also includes a stem portion 43 which is attached to the head 38 at about the center of the rearwardly-directed face 42 of the head 38 so that as the head 38, or more specifically, the forwardly-directed face 40 of the head 38 is advanced through the large diameter conduit 26, the stem portion 43 or, more specifically, the trailing end 37 of the stem 43 trails the head 38 through the conduit 26.

To facilitate the attachment of the pulling cord 22 to the carriage 30 and as best shown in FIG. 5, the carriage body 32 defines a cord-accepting opening 44 which extends longitudinally of the body 32 through both the head 38 and the stem portion 43. In particular, the opening 44 extends centrally through the body 32 so as to extend along the entire length of the stem portion 43 and opens out of the forwardly-directed face 40 at about the center thereof. Preferably, the opening 44 is tapered in size so that the diameter of the opening 44 increases in size as a path is traced forwardly through the carriage body 32 from the stem end 37. To secure the pulling cord 22 and, more specifically, the pulling cord end 23 to the carriage 30 and with reference to FIG. 5, the pulling cord end 23 can be routed (manually) through (and out of) the opening 44 by way of the stem portion 40, pulled through the head 38 by way of the forwardly-directed face 40 and then tied, or knotted, in a knot 48. When the carriage 30 is advanced along the length of the conduit 26 with the remainder of the pulling cord 22 trailing from the stem portion 43 of the carriage 30, the pulling cord 22 is prevented from exiting the trailing end 37 because the knot 48 is prevented from passing out of the opening 44 at the trailing end 37. It therefore follows that the smaller-sized section of the tapered opening 44 is smaller in diameter than the knot 48 tied in the pulling cord end 23 so that the knot 48 becomes lodged within the tapered opening 44 as the knot 48 is pulled rearwardly through the carriage opening 44. As will be apparent herein and as the carriage 30 is pulled through the conduit 26 by way of the pulling cord 22, the carriage 30 is advanced face 40-first through the conduit 26 while the trailing end 37 of the stem portion 43 follows along behind the head 38.

In use and as air, under pressure, is blown against the rearwardly-directed face 42 of the carriage 30, the head 38 of the carriage body 32 acts as a wind sail which transports, or carries, the carriage 30 along the length of the conduit 26.

Consequently, the carriage body 32 is preferably light in weight and the outer diameter of the disc-shaped head 32 is smaller than the inner diameter of the conduit 26 through which the carriage 30 is desired to be transported, although the head 30 spans an appreciable portion of the inner diameter of the conduit 26. Moreover and to enhance the stability of the carriage 30 as the carriage 30 is moved through the conduit 26 and thus ensure that the stem portion 43 follows the disc-shaped head 38 of the carriage 30 as the carriage 30 is moved along the length of the conduit 26, the overall length of the carriage 30 as measured rearwardly therealong from the forwardly-directed face 40 to the trailing end 37 of the stem portion 38 is at least as great as the inner diameter of the conduit 26 through which the carriage 30 is desired to be advanced. In other words, such a carriage length-to-conduit diameter relationship reduces any likelihood that the carriage 30 will tumble stem portion 43-overhead 38 as the carriage 30 is moved (or blown) through the conduit 26 under the influence of the delivered air.

It has been found that a suitable carriage 30 can be constructed on a 3-D printer and out of a relatively hard plastic material which provides the carriage 30 with a relatively stiff and thus inflexible nature. From a visual standpoint, the carriage resembles an umbrella in appearance wherein the head 38 of the carriage 30 provides the (upper) protective panel of the umbrella while the stem portion 43 provides the (central-disposed) shaft of the umbrella.

Further still, it has been found that the outer diameter of the head 38 can be as much as one-half inch less than the inner diameter of the conduit 26 through which the carriage 30 is desired to be transported and still be satisfactorily advanced head-end-first through the conduit 26. In addition, the rearwardly-directed face 42 of the head 38 is preferably provided with a rearwardly-curved lip portion 50 (as best shown in the cross-sectional view of FIG. 5) adjacent its outer periphery, indicated 51 in FIG. 5) circumferential edge and which is believed to enhance the entrapment of air urged against the rearwardly-directed face 42 of the head 30 during a carriage-transporting operation.

As mentioned earlier, the air which is supplied against the rearwardly-directed face 42 of the head 38 of the carriage 30 can be supplied by a conventional leaf blower 60, best shown in FIG. 9. In other words, air which is forced, or blown, out through the exhaust duct of a leaf blower 60 is normally sufficient to blow, and thus move, the carriage 30 head end-first along the length of the conduit 26. A leaf blower which has found to be suitable for use as the blower 60 is currently available from Stihl Incorporated USA of Virginia Beach, Virginia under the trade designation BR 200 Gas Backpack Blower. Leaf blowers, such as the aforementioned Stihl blower, are commonly provided with an exhaust air duct. 62 through which pressurized air is blown from the blower 60. However and to help maximize the transfer of blower-generated air pressure from the blower 60 to the interior of the conduit 26, applicants have constructed an air duct funnel 70 (best shown in FIGS. 6-9) which is attachable to an end of the exhaust air duct 62 to aid in the funneling of air which is blown from the exhaust air duct 62 of the blower 60 into an end of the conduit 26.

In connection with the foregoing and with reference still to FIGS. 6-9, the funnel 70 includes a conical-shaped funnel portion 72 having a forward, or leading tip end 74 which can be positioned within one end of the conduit 26 and an opposite rearward end 76 and whose (circular) cross section is reduced in size from a relatively large diameter to a much smaller diameter (as a path is traced forwardly of the funnel 70 from the rearward end 76 to the leading tip end 74) to permit the tip end 74 to be readily accepted by the conduit 26 when manually directed endwise into an end, indicated 25 in FIG. 9, of the conduit 26. Furthermore, there is associated with the rearward end 76 of the funnel 70 a relatively short conduit, or neck, section 78 which can be secured, as with duct tape 80 (FIG. 9) about the discharge end of the blower exhaust air duct 62 so that the air which exits the air duct 62 is funneled to and through the tip end 74 of the funnel 70. Therefore and once the funnel 70 is secured in a substantially air-tight condition about the exhaust air duct 62 of the blower 60 with the duct tape 80, the tip end 74 of the funnel 70 can be positioned (e.g. manually) into an end of the conduit 26 so that substantially all of the air which would ordinarily exit the exhaust air duct 62 during blower operation is directed into the conduit 26 for forcibly urging the carriage 30, with the pulling cord 22 attached thereto, along the length of the conduit 26.

With reference again to FIGS. 6-9, it is also a feature of the funnel 70 that it includes a groove, or channel, 82 of substantially U-shaped cross section which extends linearly along the outer surface of the funnel 70 from the rearward end 76 to the leading tip end 74 thereof. This channel 82 is designed to accept a length of the pulling cord 22 positioned (i.e. lain) therein so that as the carriage 30 is advanced by the blower 60 along the length of the conduit 26 during a cord-pulling operation, the cord 22 is permitted to move lengthwise along the length of the channel 82 as the cord 22 is unwound, or fed, from a coil 21 (FIG. 9) and pulled into the conduit 26 as the carriage 30 is forcibly urged along the length of the conduit 26. Upon exit of the carriage 30 from the opposite, or distal, end 27 (FIG. 10) of the conduit 26 through which the carriage 30 is transported and as depicted in FIG. 10, the pulling cord 22 is released, or untied (i.e. by untying the knot 48), from the carriage 30 for attachment of the pulling cord 20 to the FIG. 1 conduit 20 by way of the aforementioned pulling eye 24 (FIG. 1) for the purpose of pulling the (smaller-diameter) conduit 20 endwise through the (larger-diameter) conduit 26.

It will be understood that numerous modifications and substitutions can be had to the aforedescribed embodiment 18 without departing from the spirit of the invention. Accordingly, the aforedescribed embodiment 18 is intended for the purpose of illustration and not as limitation.

The invention claimed is:

1. A system for moving a pulling cord endwise through a cylindrical conduit, the system comprising:

an elongated carriage to which an end of a pulling cord is capable of being attached so that by moving the elongated carriage through a cylindrical conduit, the end of the pulling cord is moved through the conduit with the elongated carriage wherein the elongated carriage includes a disc-shaped head which substantially spans the interior of the cylindrical conduit through which the pulling cord is desired to be moved and an elongated stem portion which is joined to the disc-shaped head for trailing the disc-shaped head of the elongated carriage through the conduit as the elongated carriage is moved through the conduit, the disc-shaped head having a circular and forwardly-directed face and an opposite rearwardly-directed face, wherein the forwardly-directed face of the disc-shaped head has an outer diameter which is within about one-half inches less than the inner diameter of the conduit through which the elongated carriage is desired to be moved and the elongated stem portion being joined to the disc-shaped head so that the longitudinal axis of the elongated stem portion is arranged substantially normal to the rearwardly-directed face of the disc-shaped head, and wherein the elongated carriage is comprised of a relatively hard and inflexible plastic material which prevents the formation of an air seal between the elongated carriage and the inner surface of the conduit; and means for delivering air, under pressure, into the conduit so that by attaching the pulling cord to the elongated stem portion of the elongated carriage, inserting the elongated carriage head-first into the conduit and then delivering air, under pressure, into the conduit for acting against the rearwardly-directed face of the disc-shaped head of the elongated carriage, the elongated carriage, with the pulling cord attached thereto, is moved along the length of the conduit under the influence of the delivered air.

2. The system as defined in claim 1 wherein the cylindrical conduit through which the elongated carriage is desired to be moved has an inner diameter, and the length of the elongated carriage as measured rearwardly therealong from the forwardly-directed face of the disc-shaped head is at least as great as the inner diameter of the cylindrical conduit.

3. The system as defined in claim 1 wherein the elongated stem portion of the elongated carriage defines a pulling cord-accepting passageway which extends axially therethrough to facilitate the securement of the pulling cord to the elongated carriage.

4. The system as defined in claim 1 wherein the rearwardly-directed face of the disc-shaped head is bordered by a rearwardly-curved lip portion disposed adjacent the outer periphery of the disc-shaped head.

5. The system as defined in claim 1 wherein the forwardly-directed face of the disc-shaped head lies substantially in a plane.

6. A system for routing a pulling cord endwise through a cylindrical conduit having an inner diameter for purposes of securing the pulling cord to an item desired to be pulled through the cylindrical conduit with the pulling cord, the system comprising:

an elongated carriage capable of being advanced along the length of the cylindrical conduit for carrying the pulling cord along the length of the cylindrical conduit as the elongated carriage is advanced therealong wherein the elongated carriage includes a disc-shaped head having a cross section which is sized to substantially span the interior of the cylindrical conduit through which the pulling cord is desired to be carried and has a circular and forwardly-directed face having an outer diameter which is within about one-half inches less than the inner diameter of the conduit through which the elongated carriage is desired to be moved, and the elongated carriage further includes an elongated stem portion which is joined to the disc-shaped head for trailing the disc-shaped head of the elongated carriage through the conduit as the elongated carriage is moved through the conduit, the disc-shaped head having a forwardly-directed face and an opposite rearwardly-directed face, and the elongated stem portion being joined to the disc-shaped head so that the elongated stem portion extends rearwardly of and is arranged substantially normal to the rearwardly-directed face of the disc-shaped head, and wherein the elongated carriage is comprised of a relatively hard and inflexible plastic material which prevents the formation of an air seal between the elongated carriage and the inner surface of the conduit; and means for delivering air, under pressure, into the conduit so that by securing the pulling cord to the elongated carriage, inserting the elongated carriage head-first into the conduit and then delivering air, under pressure, against the rearwardly-directed face of the disc-shaped head, the elongated carriage is moved along the length of the conduit with the pulling cord.

7. The system as defined in claim 6 wherein the length of the elongated carriage as measured rearwardly therealong from the forwardly-directed face of the disc-shaped head is at least as great as the inner diameter of the cylindrical conduit through which the elongated carriage is desired to be moved.

8. The system as defined in claim 6 wherein the elongated stem portion of the elongated carriage defines a pulling cord-accepting passageway which extends axially along the elongated stem portion to facilitate the securement of the pulling cord to the elongated carriage by directing the pulling cord axially through the pulling cord-accepting passageway.

9. The system as defined in claim 6 wherein the rearwardly-directed face of the disc-shaped head is bordered by a rearwardly-curved lip portion disposed adjacent the outer periphery of the disc-shaped head.

10. The system as defined in claim 6 wherein the forwardly-directed face of the disc-shaped head lies substantially in a plane.

11. The system as defined in claim 6 wherein the elongated stem portion has a trailing end which follows the rearwardly-directed of the disc-shaped head of the elongated carriage as the elongated carriage is moved through the conduit, and the end of the pulling cord is securable to the carriage so that as the elongated carriage is moved through the elongated conduit, the pulling cord trails along behind the trailing end of the elongated stem portion.

12. A system for routing a pulling cord endwise through a cylindrical conduit having an inner diameter for purposes of securing the pulling cord to an item desired to be pulled through the conduit with the pulling cord, the system comprising:

an elongated carriage capable of being advanced along the length of the cylindrical conduit and for carrying the pulling cord as the elongated carriage is advanced along the length of the cylindrical conduit wherein the elongated carriage includes a disc-shaped head having a cross section which is sized to substantially span the interior of the cylindrical conduit through which the pulling cord is desired to be carried and an elongated stem portion which is joined to the disc-shaped head for trailing the disc-shaped head of the elongated carriage through the conduit as the elongated carriage is advanced through the conduit, the disc-shaped head having a circular and forwardly-directed face and an opposite circular and rearwardly-directed face, wherein the forwardly-directed face of the disc-shaped head has an outer diameter which is within about one-half inches less than the inner diameter of the conduit through which the elongated carriage is desired to be advanced and wherein the elongated stem portion is joined to the disc-shaped head at about the center of the rearwardly-face thereof so that the elongated stem portion is arranged substantially normal to and extends rearwardly of the rearwardly-directed face of the disc-shaped head, and wherein the elongated carriage is comprised of a relatively hard and inflexible plastic material which prevents the formation of an air seal between the elongated carriage and the inner surface of the conduit and is devoid of a conduit-engaging skirt portion for extending along the inner surface of the conduit, and means for delivering air, under pressure, into the conduit so that by securing the pulling cord to the elongated stem portion of the elongated carriage, inserting the elongated carriage head-first into the conduit and then delivering air, under pressure, into the conduit so that the rearwardly-directed face of the disc-shaped head is exposed to the delivered air, the elongated carriage is advanced along the length of the conduit with the pulling cord.

13. The system as defined in claim 12 wherein the elongated carriage has an overall length as measured rearwardly therealong from the forwardly-directed face of the disc-shaped head which is at least as great as the inner diameter of the cylindrical conduit through which the elongated carriage is desired to be advanced to reduce the likelihood that the elongated carriage will tumble stem portion-over-disc-shaped head portion as the carriage is advanced along the conduit.

14. The system as defined in claim 13 wherein the forwardly-directed face of the disc-shaped head lies substantially in a plane.

15. The system as defined in claim 12 wherein the elongated stem portion of the elongated carriage defines a pulling cord-accepting opening which extends lengthwise through the elongated carriage to facilitate the securement of the pulling cord to the elongated carriage.

16. The system as defined in claim 12 wherein the rearwardly-directed face of the disc-shaped head is bordered by a rearwardly-curved lip portion disposed adjacent the outer periphery of the disc-shaped head.

17. The system as defined in claim 12 wherein the means for delivering air is a leaf blower.

\* \* \* \* \*